United States Patent [19]

Yanagisawa

[11] Patent Number: 4,930,199
[45] Date of Patent: Jun. 5, 1990

[54] METHOD FOR MANUFACTURING FIBER FROM THIN PLATE MATERIAL

[76] Inventor: Akira Yanagisawa, 481-1, Nishihara, Miyashiro-machi, Minamisaitama-gun, Saitama-ken, Japan

[21] Appl. No.: 281,380

[22] Filed: Dec. 8, 1988

[30] Foreign Application Priority Data

Dec. 9, 1987 [JP] Japan .................................. 62-311753
Jun. 13, 1988 [JP] Japan .................................. 63-144973

[51] Int. Cl.$^5$ ........................ B23B 1/00; B23P 17/06
[52] U.S. Cl. ....................................... 29/4.51; 83/913
[58] Field of Search ...................... 29/4.5 R, 4.5 A; 83/913

[56] References Cited

U.S. PATENT DOCUMENTS

| 662,392 | 11/1900 | Bühre | 29/4.5 A |
| 1,779,318 | 10/1930 | Jeannin | 29/4.5 A |
| 4,640,156 | 2/1987 | Nakagawa et al. | 29/4.5 R X |

FOREIGN PATENT DOCUMENTS 205239 11/1984 Japan ................................. 29/4.5 R Primary Examiner—Timothy V. Eley
Attorney, Agent, or Firm—Pollock, Vande Sande & Priddy

[57] ABSTRACT

A fiber is manufactured by winding a strip of thin plate material made of a metal or the like around the cylindrical outer surface of a rotatably supported main shaft a large number of times and fixing it thereto, by rotating the main shaft in the direction opposite to that in which the plate material is wound at constant speed, and by feeding a cutter having an edge line thereof expending perpendicular to the axis of the main shaft and a face angle ranging between 21 degrees and 37 degress parallel to the axis of the main shaft and at a constant speed and thereby cutting the end surface of the plate material by the cutter. In consequence, finer and soft long fiber can be manufactured effectively at a low cost.

4 Claims, 4 Drawing Sheets

METHOD FOR MANUFACTURING FIBER FROM THIN PLATE MATERIAL

BACKGROUND OF THE INVENTION

1. Field of the Invention

The present invention relates to a method and apparatus for manufacturing fine fiber by cutting a metal material or the like.

2. Description of the Related Art

A wire cutting method is known for use as a conventional metallic fiber manufacturing method. In this wire cutting method, a long metal wire having a diameter of about 3 mm which is drawn from one of two reels is wound around a pair of rolls with a plurality of guide groove provided thereon. It is then wound around the other reel so that a plurality of metal wires can be fed between the rolls in the same direction and at the same speed. A cutter is then pressed against the face formed by these large number of metal wires so as to produce fine metallic fiber.

However, the above-described conventional metallic fiber manufacturing method involves cutting of long metal wires which are drawn in one direction and therefore has disadvantages in that it is difficult to apply it to the manufacture of fiber from a material having a low strength. A scratch formed in the surface of the metal wire causes stress to be concentrated on that scratched portion, which leads to the cutting of the metal wire. The conventional metallic fiber manufacturing method also suffers from the problem that it is difficult to manufacture fiber of good quality having a uniform diameter due to variations in the depth of cut caused by vibrations that occur during the manufacture. Further, since the entire portions of the metal wires cannot be utilized as fiber materials in that conventional method, production efficiency is degraded, and the production cost is increased.

SUMMARY OF THE INVENTION

A primary object of the present invention is to provide a fiber manufacturing method which is capable of effectively manufacturing fiber having a good quality from a metal or the like at a low production cost.

In order to attain the above-described primary object, a fiber manufacturing method of the present invention comprises the steps of: winding a strip of thin plate material around the cylindrical outer surface of a rotatably supported main shaft and fixing it thereto; rotating the main shaft in the direction opposite to that in which the strip of plate material is wound at a fixed speed; and cutting the end surface of the plate material by a cutter having an edge line extending perpendicular to the axis of the main shaft and a face angle ranging between 21 degrees and 37 degrees by feeding the cutter at a constant speed toward the end surface of the plate material parallel to the axis of the main shaft thereby manufacturing fiber.

In the present invention, fiber can be manufactured efficiently substantially in proportion to the number of times that the plate material is wound and the feed rate of the cutter, and all of the plate material which is wound around the winding portion can be utilized without generating waste. Further, since the end surface of the plate material is cut by bringing the cutter into contact with the end surface of the plate material from a suitable direction and at a suitable angle, soft and long fiber can be manufactured without generating faulty fiber, resulting in production of fiber having a good quality in an efficient manner at a low cost.

A second object of the present invention is to provide a fiber manufacturing method which is capable of manufacturing a large quantity of finer fiber at a low cost.

In order to achieve the above-described second object, the fiber manufacturing method of the present invention comprises the steps of: preparing a plate material by laminating a plurality of strips of thin plate made of the same type of substance or different types of substance one on top of the other and by roll-spreading the laminated plates; winding the plate material around the cylindrical outer surface of a rotary shaft a large number of times and fixing it thereto; rotating the rotary shaft in the direction opposite to that in which the plate material is wound at a constant speed; and cutting the end surface of the plate material by a cutter having an edge line extending perpendicular to the axis of the rotary shaft and a face angle ranging between 21 degrees and 37 degrees by feeding the cutter toward the end surface of the plate material wound parallel to the axis of the rotary shaft at a fixed speed and thereby manufacturing fiber.

In the present invention, a plurality of strips of thin plate made of the same type of substance or different types of substance are laminated one on top of the other, and the laminated plates are then rolled spread so as to prepare a plate material. In consequence, a laminated material consisting of a plurality of plates each of which has a very small thickness can be obtained. Further, since the thus-prepared rolled and laminated plate is used as the plate material, finer fiber can be manufactured. Furthermore, if a plurality of plates made of different types of substances are laminated, a mixture of fibers having different properties can be readily obtained concurrently with the cutting.

Further, since the end surface of the plate material wound around the rotary shaft rotated at a constant speed a large number of times is cut by bringing the cutter fed at a constant feed rate into contact with the end surface of the plate material, the layers of the plate material which are piled one on top of the other coaxially are cut at one time, and a large quantity of fiber can be thereby continuously manufactured. Further, fiber can be effectively manufactured substantially in proportion to the number of times that the plate material is wound and the feed rate of the cutter, and the entire plate material wound can be utilized as a material.

A third object of the present invention is to provide a fiber manufacturing apparatus which is suitably used to carry out the above-described methods, and which has a simple structure.

In order to attain the above-described third object, the fiber manufacturing apparatus of the present invention comprises: a main shaft rotatably supported on the upper surface of a bed; a first rotation transmitting means for transmitting the rotating of a rotation driving source to the main shaft; a winding portion provided on the main shaft, the winding portion having a cylindrical outer surface which is coaxial with respect to the main shaft and around which a strip of thin plate material can be wound a large number of times and be then fixed thereto; a strip of thin plate material wound around the outer surface of the winding portion a large number of times and fixed thereto; a tool post having a cutter, the tool post being movable parallel to the axis of the main shaft; a second rotation transmitting means for transmitting the rotation of the main shaft to a feed screw through a reduction gear; and a feed nut fixed to the tool post, the feed nut being threadedly engaged with the feed screw, wherein the cutter is disposed in such a manner that the edge line of the cutter extends perpendicular to the axis of the main shaft and that the face angle thereof ranges between 21 degrees and 37 degrees when the cutter makes contact with the end surface of the plate material wound around the winding portion.

In the present invention, rotation of the main shaft, i.e., the plate material, and movement of the cutter can be obtained by using one rotating driving source. Further, since the rotation of the main shaft is decelerated and transmitted to the feed screw so as to rotate the feed screw and thereby move the tool post, the feed rate of the tool post, i.e., the cutter, can be minutely set, resulting in manufacture of fine fiber.

Other objects, features and advantages of the present invention will become apparent from the following description of the preferred embodiments thereof, taken in conjunction with the accompanying drawings.

DETAILED DESCRIPTION OF THE PREFERRED EMBODIMENTS

An embodiment of the present invention will be described below in detail with reference to the accompanying drawings.

Figure 1:
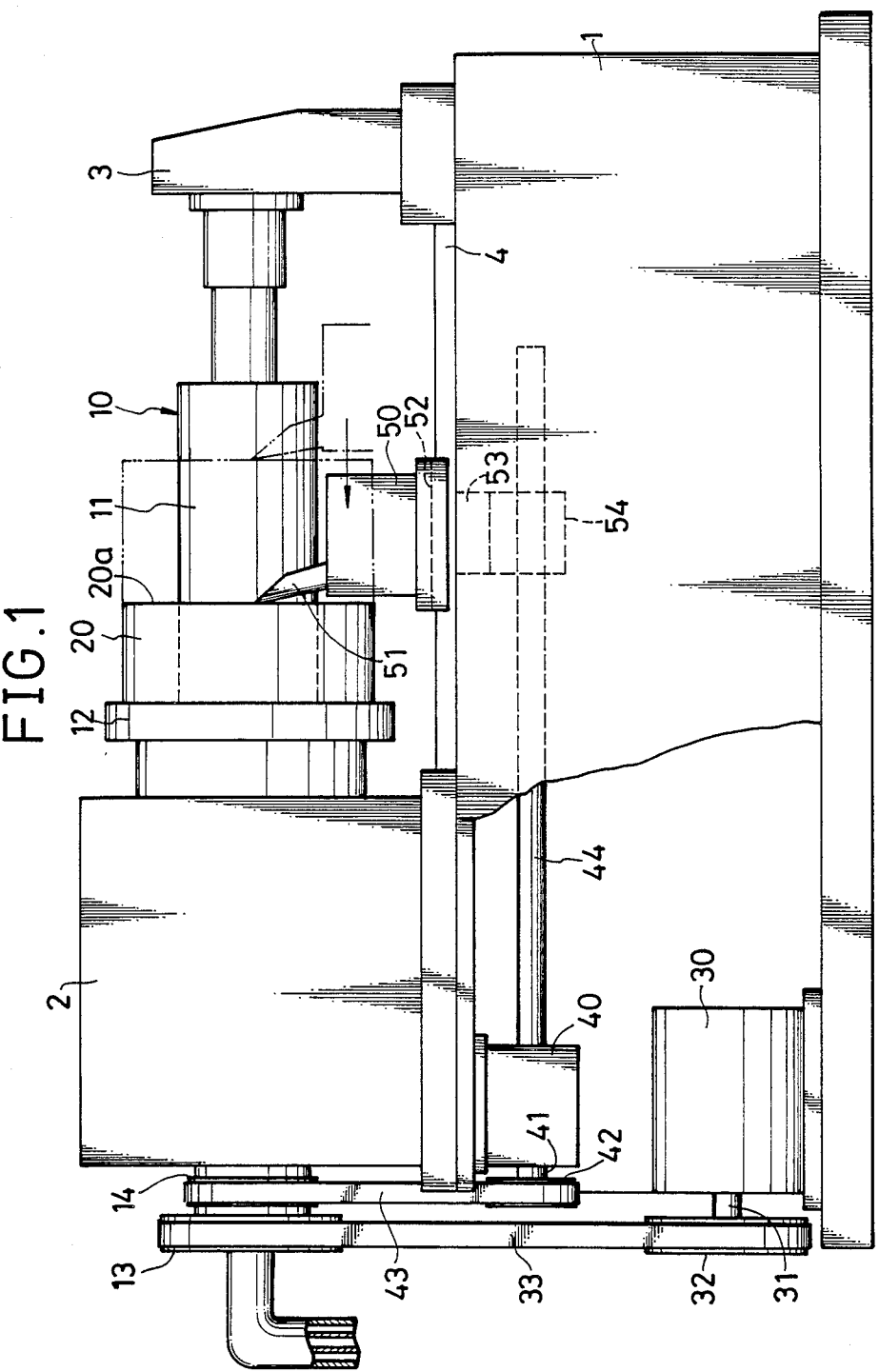
FIG. 1 is a side elevational view of a metallic fiber manufacturing apparatus which adopts a metallic fiber manufacturing method of the present invention, showing an embodiment of the present invention.
Figure 2:
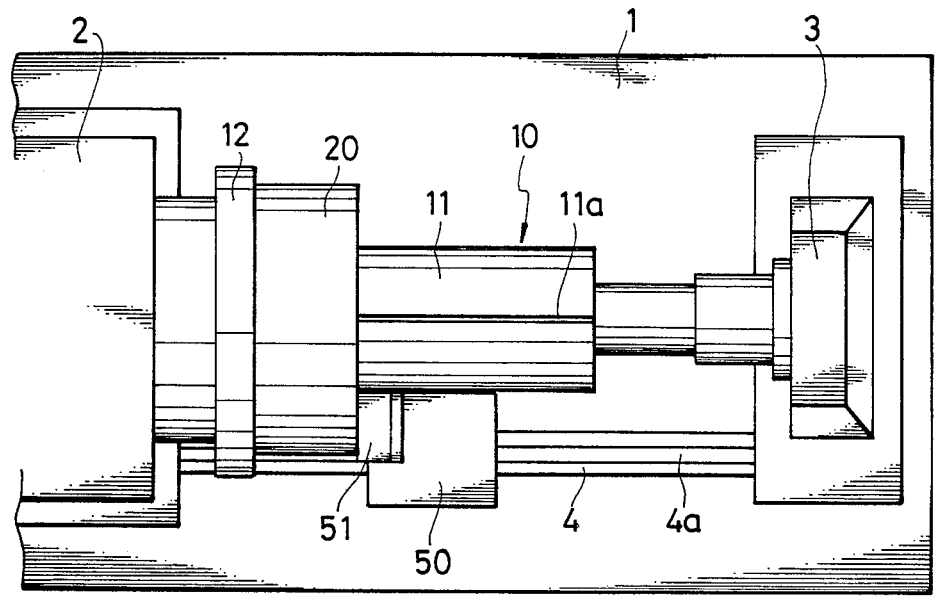
FIG. 2 is a top view of the essential parts of FIG. 1.

Referring first to FIG. 1, a metallic fiber manufacturing apparatus includes a square, hollow bed 1 which is disposed on the floor or the like, and a bearing stand 2 and a support 3 respectively accommodating a bearing (not shown) therein. The bearing stand 2 and the support 3 are disposed on the upper surface of the bed 1 at positions separated from each other at a predetermined interval and that both bearings are positioned on the same axis.

The metallic fiber manufacturing apparatus also includes a multi-stage main shaft 10 which is rotatably supported by the support 3 at one end portion (at the right end portion as viewed in FIG. 1) and by the bearing stand 2 at the other end portion (at the left end portion thereof as viewed in FIG. 1). The portion of the main shaft 10 which is located between the bearing stand 2 and the support 3 has a winding portion 11 having a cylindrical outer surface that is disposed coaxially with respect to the main shaft 10 and that has a groove 11a which runs in the axial direction of the winding portion, and a collar portion 12 having a larger diameter than that of the winding portion 11, the collar portion 12 being disposed on the side of the winding portion 11 which is closer to the bearing stand 2. A strip of thin metal plate 20 which is a material plate is wound around the winding portion 11 a larger number of times.

Winding of the strip of metal plate 20 will be described below with reference to FIG. 3. The strip of metal plate 20 is made of brass or copper. It has a thickness of about 0.1 mm and a width of about 100 mm, and has an elongated form. The winding portion 11 has a diameter of about 180 mm. The groove 11a of the winding portion 11 has a width and a depth large enough to accommodate the end portion of the strip of metal plate 20 and hook it therein. When the strip of metal plate 20 is to be wound around the winding portion 11, the end portion thereof is inserted into the groove 11a and is then bent. Thereafter, the strip of metal plate 20 is wound around the winding portion clockwise as viewed in FIG. 3 a large number of times in the state where the one edge of the stip of metal plate 20 is in contact with the side surface of the collar portion 12 until the diameter of the strip of metal plate 20 wound becomes about 200 mm. The strip of metal plate 20 is then cut, and the end portion thereof is adhered to the surface thereof using an adhesive or by means of spot welding or laser welding.

Two pulleys 13 and 14 having different diameters are fixed to the portion of the main shaft 10 which protrudes from the bearing stand 2 coaxially with respect to each other.

A motor 30 is fixed to the inner lower surface of the bed 1, and a pulley 32 is fixed to a rotary shaft 31 of the motor 30. The pulley 32 is coupled to the pulley 13 of the main shaft 10 through a belt 33 so that the main shaft 10 can be rotated by operating the motor 30.

In the bed 1, a reduction gear 40 provided with a connection means (not shown) such as an electromagnetic clutch is fixed to the inner upper surface of the bed 1. A pulley 42 is fixed to an input shaft 41 of the reduction gear 40. The pulley 42 is coupled to the pulley 14 of the main shaft 10 through a belt 43 so that the rotation of the main shaft is transmitted to the input shaft 41 of the reduction gear 40 while the main shaft 10 is being rotated. A feed screw 44 which is disposed parallel to the axis of the main shaft 10 is coupled to an output shaft (not shown) of the reduction gear 40.

A tool post 50 having a cutter 51 made of high speed steel or hard metal is provided on the outer upper surface of the bed 1. The tool post 50 has a guide groove 52 at the lower surface thereof. The guide groove 52 slidably engages with a guide rail 4 disposed on the upper surface of the bed 1 parallel to the main shaft 10. A leg plate 53 protrudes downward from the lower surface of the tool post 50 through an elongated hole 4a formed in the guide rail 4, and a feed nut 54 which is threadedly engaged with the feed screw 44 is fixed to the leg plate 53. This allows the tool post 50 to slide along the guide rail 4 on the upper surface of the bed 1 parallel to the main shaft 10 when the feed screw 44 is rotated.

Figure 4:
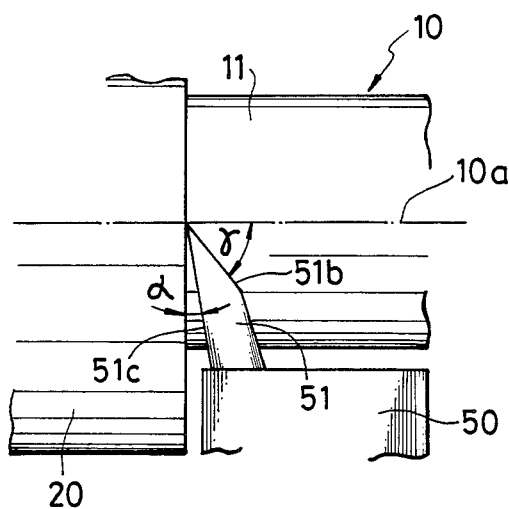
FIG. 4 is an enlarged view of the essential parts of FIG. 1.
Figure 5:
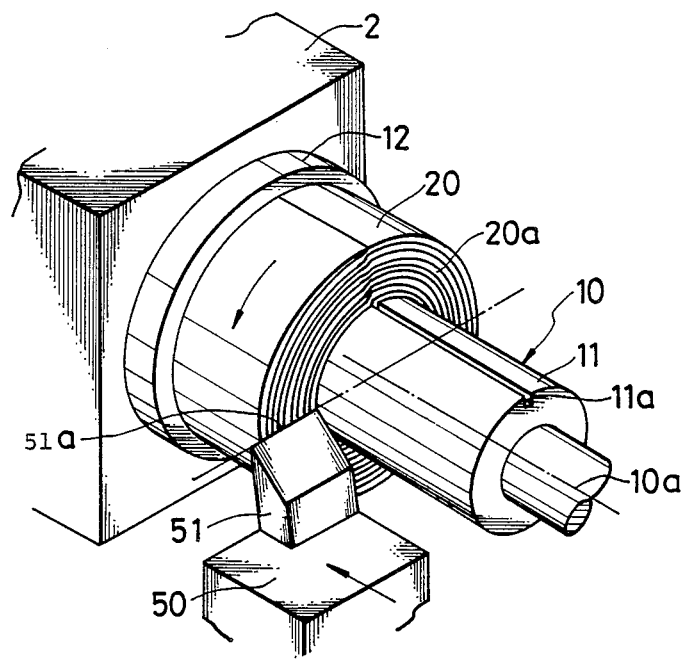
FIG. 5 is a perspective view of the essential parts of FIG. 1.

The cutter 51 has a cutting edge line 51a which extends perpendicular to an axis 10a of the main shaft 10, as shown in FIGS. 4 and 5, and which makes contact with the center line the horizontally bisects an end face 20a (the machined surface) of the strip of metal plate 20 wound on the winding portion 11. An angle γ formed between a face 51b of the cutter 51 and the axis 10a (a face angle) is set at a suitable value which ranges between 21 degrees and 37 degrees. An angle α formed between a flank 51c of the cutter 51 and the end face 20a of the strip of metal plate 20 (a back clearance angle) is set at about 10 degrees.

Figure 6:
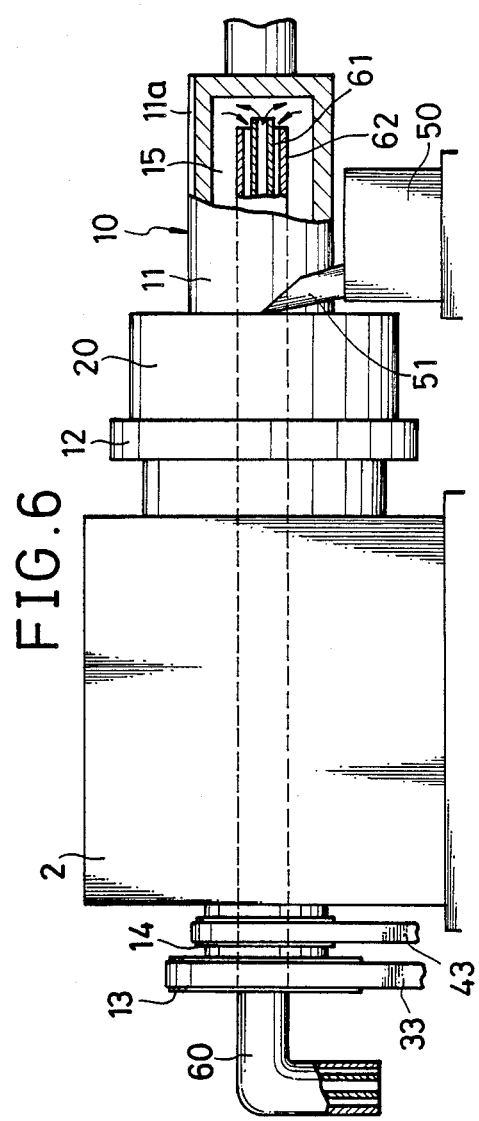
FIG. 6 is a side elevational view of a main shaft.

The main shaft 10 has a cavity 15 therein which extends from the end surface thereof to which the pulleys 13 and 14 are fixed to the winding portion 11, as shown in FIG. 6, and a cooling pipe 60 is hermetically inserted into the cavity 15. The cooling pipe 60 consists of two pipes, i.e., an inner pipe 61 and an outer pipe 62. Water is supplied into the cavity 15 through the inner pipe 61 by the operation of a pump (not shown), the water being then sucked into the outer pipe 62 and thereby being circulated.

This cooling means precludes the possibility of changes in the cutting conditions by the heat generated during the cutting, e.g., change in the feed rate of the cutter due to the expansion of the strip of metal plate 20. It is capable of cooling the main shaft 10, in particular, the winding portion 11 around which the strip of metal plate 20 is wound.

Next, the manufacture of metallic fiber by the above-described metallic fiber manufacturing apparatus will be described.

Figure 3:
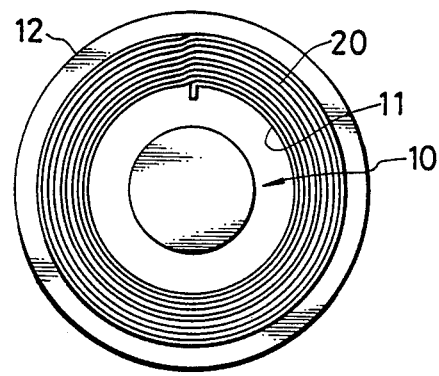
FIG. 3 is a front view of a main shaft.

First, the main shaft 10 is rotated at a fixed speed counterclockwise as viewed in FIG. 3, i.e., in the direction opposite to that in which the strip of metal plate 20 is wound, by operating the motor 30. Next, the input shaft of the reduction gear 41 is coupled to the output shaft thereof in that state so as to rotate the feed screw 44 with the main shaft 10 and thereby feed the tool post 50 along the guide rail 4 toward the end face 20a of the strip of metal plate 20 at a fixed speed. This presses the cutter 51 against the end surface 20a of the strip of metal plate 20, by means of which fine metallic fiber can be cut from the end surface 20a. Thus, in the case where a strip of metal plate 20 made of brass is used, about 7.5 kg of fiber may be manufactured per hour by feeding the cutter 51 at a feed rate of 0.01 mm/revolution and by cutting the strip of metal plate at a cutting speed of 90 m/min into pieces of fiber having a width of cut of 18 mm. A feed rate of twice the above value ensures manufacture of metallic fiber of about 15 kg per hour.

In order to conduct the cutting effectively, it is necessary for the face angle $\gamma$ of the cutter 51 to be set at a suitable value. The present inventors conducted experiments to examine how the quality of fiber produced and a reduction in the rotational speed of the main shaft are affected by a face angle $\gamma$ when a strip of metal plate 20 made of brass is wound around a winding portion 11 having a diameter of 150 mm until the diameter of the strip of metal plate becomes about 180 mm and when the cutting is performed under the conditions that the rotational speed of the main shaft 10 is 150 rpm, the width of cut is 13 mm, and the back clearance angle $\alpha$ is 10 degrees. Tables (1) and (2) show the results of the experiments obtained where the feed rate of the cutter 51 is set at 0.01 mm/revolution and 0.02 mm/revolution, respectively.

TABLE (1)

| (Feed rate: 0.01 mm/revolution) | | |
|---|---|---|
| Face angle $\gamma$ (°) | Quality of fiber | Reduction in rotational speed of main shaft |
| 20 or less | Not good | Large |
| 21 through 25 | Fair | Comparatively large |
| 26 through 34 | Good | Comparatively large |
| 35 | Best | Small |
| 36, 37 | Good | Small |
| 38 or above | Not good | Small |

TABLE (2)

| (Feed rate: 0.02 mm/revolution) | | |
|---|---|---|
| Face angle $\gamma$ (°) | Quality of fiber | Reduction in rotational speed of main shaft |
| 20 or less | Not good | Large |
| 21 through 25 | Fair | Large |
| 26 through 34 | Good | Comparatively large |
| 35 | Best | Small |
| 36, 37 | Good | Small |
| 38 or above | Not good | Small |

As is clear from the above tables, where the feed rate was set at 0.01 mm/revolution, then when the face angle $\gamma$ was at 20 degrees or below, curly short fibers which were sintered together were produced due to the increase in the cutting resistance and the heat generated as the result of that increase in the cutting resistance. Further, the rotational speed of the main shaft 10 was reduced by about 10 rpm. When the face angle $\gamma$ was at 38 degrees or above, the rotational speed of the main shaft 10 was not reduce by much. However, it was difficult to produce long fibers due to the chatter generated during the cutting. Where the face angle $\gamma$ was set at between 21 degrees and 37 degrees, then when the face angle $\gamma$ was set at the smaller values within that range, the rotational speed of the main shaft 10 was slightly reduced but almost excellent long fibers were obtained, although the obtained fibers was not sufficiently soft. In particular, when the face angle $\gamma$ was at 35 degrees, the reduction in the rotational speed of the main shaft 10 was very small, and the obtained fibers had the best quality. Where the feed rate was at 0.02 mm/revolution, substantially the same results as those obtained with the feed rate set at 0.01 mm/revolution were obtained, with the exception of the rotational speed of the main shaft 10, which was reduced at a slightly different way. That is, it was found out that the setting of the face angle $\gamma$ between 21 degrees and 37 degrees produced fibers having a good quality, and that the setting of the face angle $\gamma$ at 35 degrees produced fibers having the best quality.

Thus, in the above-described metallic fiber manufacturing method, since the main shaft 10 is rotated in the direction opposite to that in which the strip of metal plate 20 is wound thereon, the strip of metal plate 20 does not become loosened during the rotation. Further, the end surface of the strip of metal plate 20 wound around the winding portion 11 of the main shaft 10 rotated at constant speed a large number of times is cut by pressing the cutter 51 fed at a fixed feed rate against the end surface 20a of the strip of metal plate 20 so as to manufacture metallic fibers. In consequence, metallic fibers can be effectively produced substantially in proportion to the number of times that the strip of metal plate 20 is wound and the feed rate of the cutter 51, and the entire strip of metal plate 20 that is wound can be utilized as fiber material without generating waste. Further, the face angle $\gamma$ of the cutter 51 is set at between 21 degrees and 37 degrees, and fine and soft long fibers can be thereby manufactured without generating faulty fibers.

In the metallic fiber manufacturing apparatus which adopts the above-described metallic fiber manufacturing method, rotation of the main shaft 10 is transmitted to the input shaft 41 of the reduction gear 40 through the belt 43. In consequence, the main shaft 10 and the feed screw 44 can be rotated concurrently by a single motor 30, and the tool post 50 can be fed with the rotation of the main shaft 10. Further, since the rotation of the main shaft 10 is decelerated and is then transmitted to the feed screw 44 so as to rotate the feed screw 44 and thereby feed the tool post 50, the feed rate of the tool post 50, i.e., of the cutter 51, can be set very finely, which ensures production of fine metallic fibers. Furthermore, since the tool post 50 can be moved along the guide rail 4 without rattling, the cutter 51 can always be pressed against the end face 20a of the strip of metal plate 20 from a suitable direction and at a suitable angle. Furthermore, the outer surface of the winding portion 11 is provided with the groove 11a which runs in the axial direction of the winding portion 11, and the end portion of the strip of metal plate 20 is inserted into the groove 11a. As a result, the strip of metal plate 20 can be readily wound around the winding portion 11 tightly, preventing faulty cutting due to faulty winding and thereby producing metallic fibers of good quality.

The productivity of the metallic fibers may be further increased by increasing the diameter of the strip of metal plate which is wound, by providing a plurality of cutters in the radial direction, or by providing a plurality of the above-described manufacturing apparatuses. Further, the strip of metal plate 20 may be wound around a cylindrical cassette reel which can be fitted on the main shaft 10 in such a manner that it cannot be rotated relative to the main shaft 10 a predetermined number of times without being wound directly around the main shaft 10, the cassette reel around which the strip of metal plate has been wound being fitted on the main shaft 10.

In order to manufacture finer fibers by the above-described metallic fiber manufacturing method, it is necessary to prepare a thinner solid plate. However, the thickness of a plate that can be readily obtained is limited to about 100 $\mu$m from the viewpoint of the material manufacturing technique, the manufacture of a thinner plate increasing the production cost. This problem will be overcome by the embodiment which is to be described below.

This embodiment involves preparation of very thin plate material and the manufacture of fibers from this plate material which is wound around the outer surface of the winding portion of the main shaft of the above-described manufacturing apparatus using the same manufacturing method. The thin plate material is prepared by laminating a plurality of strips of thin plate made of the same type of substance or of different types of substance one on top of the other and then roll-spreading them. Each of the resultant laminated plates has a very small thickness.

Figure 7:
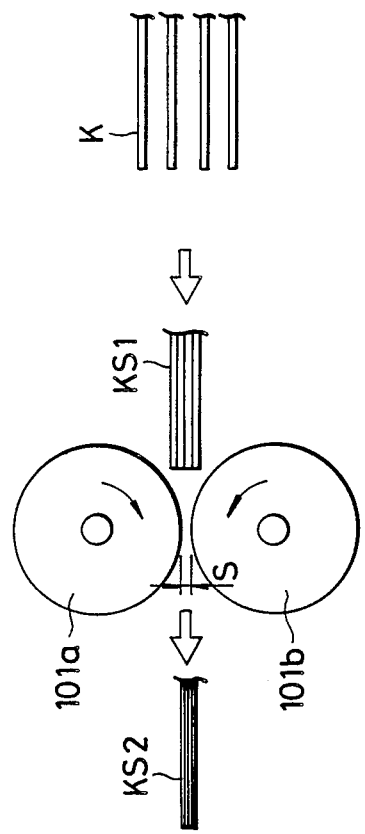
FIG. 7 shows a laminate/roll device, of another embodiment.

The second embodiment will now be described in detail with reference to FIG. 7, which schematically shows a laminating/rolling device for manufacturing the above-described laminated plates. The device includes a pair of cylindrical rolling rollers 101a and 101b, which are disposed parallel to each other and in alignment with each other in the horizontal direction with a predetermined interval S therebetween. The rolling rollers 101a and 101b are driven by a driving motor (not shown) at the same speed and in opposite directions.

Lamination and roll-spreading of plates will be described below.

Lamination and roll-spreading of plates are conducted by laminating a plurality of strips of plate and then roll-spreading the laminated plates. For example, four strips of plate K made of brass each of which has a thickness of about 100 $\mu$m are laminated to form laminated plates KS1, and the laminated plates KS1 are then supplied to the rolling rollers 101a and 101b to roll-spread them. If the rolling dimension S between the rolling rollers 101a and 101b is set at 100 $\mu$m, laminated plates KS2 having the same thickness can be prepared. This produces four thinly laminated plates each of which has a thickness of about 25 $\mu$m.

The thus-prepared laminated plates which serves as the plate material 20 are wound around and made to adhere to the winding portion 11 in the same manner as that in which it is wound in the first embodiment, and the manufacturing apparatus is operated in the same manner as it is operated in the first embodiment to manufacture fine fibers by means of cutting.

In the case where the plate material 20 is made of brass, about 7.5 kg of fibers having a dimension of about 28 $\mu$m can be produced per hour when the width of cut is at 18 mm, the feed rate of the cutter 51 is at 0.01 mm/revolution, and the cutting speed is at 90 m/min. A feed rate of twice the above value ensures the manufacture of about 15 kg of fibers per hour.

Thus, in the above-described fiber manufacturing method, four strips of thin plate K are laminated one on top of the other to form laminated plates KS1, and these plates KS1 are supplied to the rolling rollers 101a and 101b to roll-spread them. It is therefore possible to prepare laminated plates each of which has a very small thickness. Further, since the thus-prepared rolled laminated plates KS2 are used as the plate material 20, fine fibers can be produced. Furthermore, since the layers of the plate material 20 which are coaxially piled one on top of the other are cut at the same time, a large quantity of fibers can be continuously produced.

In the case where the plate K is made of a relatively soft metal such as brass or copper, a plate material having a thickness of about 10 $\mu$m can be obtained by the rolling, the thickness of the plate which has been rolled depending on the number of plates K which are laminated and the rolling dimension S between the rolling rollers 101a and 101b. Furthermore, the material of a plate is not limited to brass and copper, but other metals such as aluminum, nickel, titanium, iron and stainless steel may also be employed. Alternatively, a non-metal material that can be cut such as a synthetic resin, ceramics or glass, or a mixture of these metal and non-metal materials may also be used. When the plates are laminated and roll-spread, they may adhere to each other due to the heat generated by the rolling or due to plastic deformation of the plates caused by foreign matter mixed into the plates or a scratch formed therein, precluding smooth separation of the fibers which are cut. This may be prevented by coating a lubricant such as silicone oil between the plates prior to the lamination and rolling. Furthermore, in the above-described second embodiment, plates made of the same type of substance are laminated and roll-spread to form the plate material 20. However, plates K made of different types of substance may also be laminated and rolled so as to produce mixture of fibers having different properties concurrently with the cutting.

Furthermore, the outer peripheral edges of the rolled and laminated plates KS2 may not be even, this non-even outer peripheral edge causing faulty winding of the plate material 20. Consequetly the outer peripheral edges of the plate material may be trimmed by a suitable cutter before it is wound around the winding portion 11. Further, if there is a possibility of the plate material 20 being crinkled or damaged when it is wound around the winding portion 11, a pressure roll capable of imparting a predetermined amount of pressure toward the center of the winding portion 11 may be provided so as to press the plate material 20 against the winding portion 11 while it is being wound therearound.

What is claimed is:

1. A fiber manufacturing method comprising the steps of:
    winding a strip of thin plate material around the cylindrical outer surface of a rotatably supported main shaft and fixing it thereto;
    rotating said main shaft in the direction opposite to that in which said strip of plate material is wound at a fixed speed; and
    cutting the end surface of said plate material by a cutter having an edge line expending perpendicular to the axis of said main shaft and a face angle ranging between 21 degrees and 37 degrees by feeding said cutter toward said end surface of said plate material parallel to the axis of said main shaft and at constant speed.

2. A fiber manufacturing method according to claim 1, wherein said plate material employed is prepared by laminating a plurality of strips of thin plates made of the same type of substance or different types of substance and then by roll-spreading the laminated plates.

3. A fiber manufacturing method according to either of claims 1 and 2, wherein said plate material is made of a metallic material consisting of one of the group of materials including brass, copper, aluminum, nickel, titanium, iron or stainless steel.

4. A fiber manufacturing method according to either of claims 1 and 2, wherein said plate material is made of non-metal material consisting of one of the group of materials including a synthetic resin, ceramic or glass.

* * * * *